United States Patent

Harbeson

[15] 3,668,556

[45] June 6, 1971

[54] AUTOMATIC GAIN CONTROL CIRCUIT

[72] Inventor: William D. Harbeson, Montville, N.J.

[73] Assignee: Ohmega Laboratories, Pine Brook, N.J.

[22] Filed: May 11, 1971

[21] Appl. No.: 142,369

Related U.S. Application Data

[63] Continuation of Ser. No. 810,450, Mar. 26, 1969, abandoned.

[52] U.S. Cl. ................................331/109, 325/147, 330/2, 331/173, 331/183

[51] Int. Cl. ................................H03b 3/02

[58] Field of Search..................331/183, 182, 172, 173, 174, 331/109; 325/147; 330/2

[56] References Cited

UNITED STATES PATENTS 2,798,947 7/1957 Dodington..............................331/183

*Primary Examiner*—John Kominski

*Attorney*—March, Le Fever, Wyatt and Lazar

[57] ABSTRACT

An automatic gain control circuit for pulsed oscillators or other gate circuits which are intermittently operated. The control voltage for the amplitude of oscillator output is regulated to a substantially constant value even during the non-operating or blanking portion of the oscillator operation by a resistance-diode network responding to a blanking or switching signal in phase with the blanking or gating signals controlling the operation of the oscillator.

5 Claims, 1 Drawing Figure

PATENTED JUN 6 1972
3,668,556
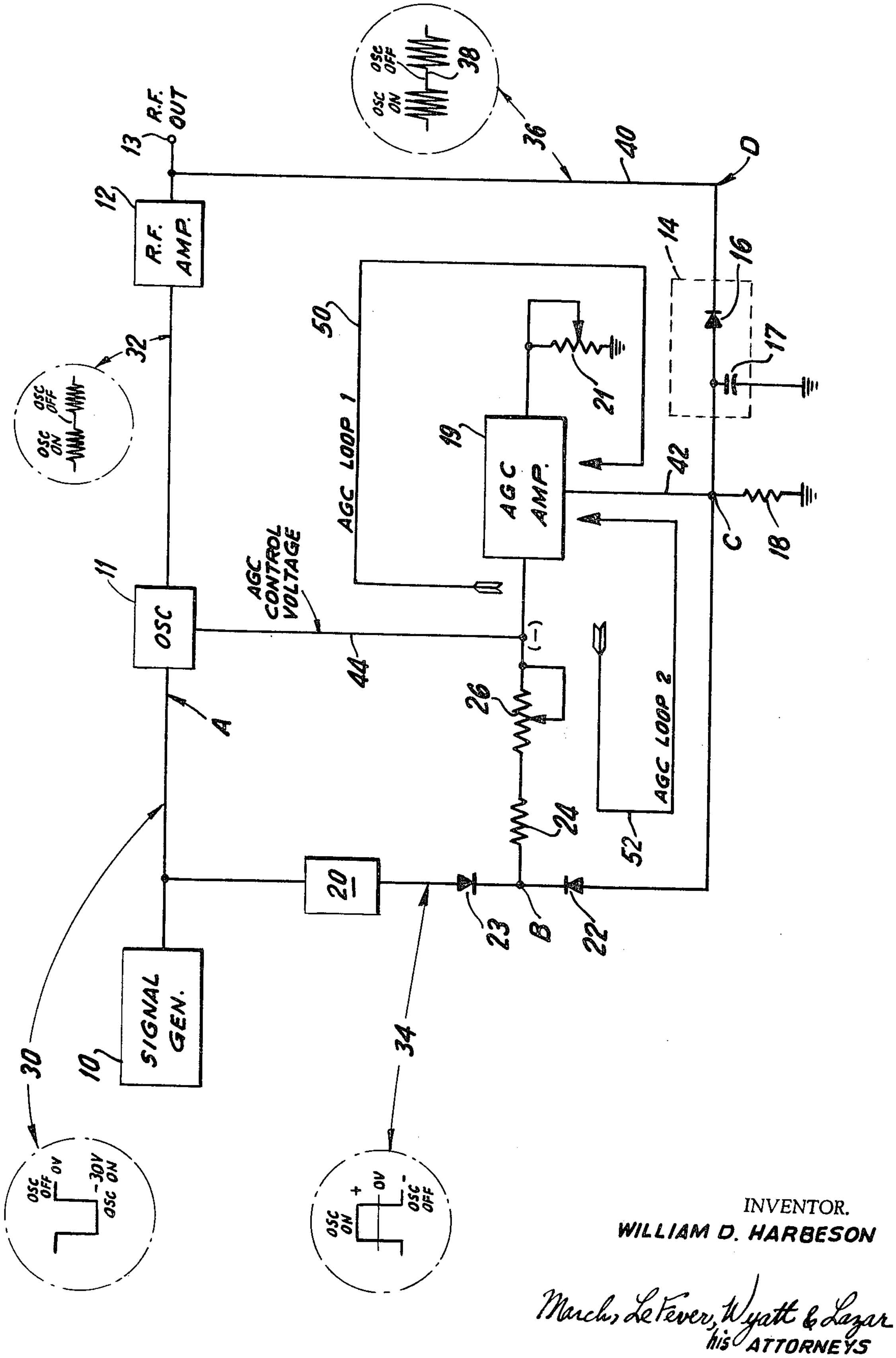
INVENTOR.
WILLIAM D. HARBESON
March, LeFever, Wyatt & Lazar
his ATTORNEYS

AUTOMATIC GAIN CONTROL CIRCUIT

This application is a continuation of Ser. No. 810,450, filed Mar. 26, 1969 and now abandoned.

BACKGROUND OF THE INVENTION

1. Field of the Invention

This invention relates to automatic gain control circuits and more particularly to automatic gain control circuits for regulating the control voltages for gated oscillator circuits.

2. Description of the Prior Art

In certain fields in electronic equipment pulsed oscillators or other gated circuits develop bursts of high frequency energy for test or other purposes. For example, bursts of high frequency energy are used to obtain the frequency response of an amplifier under test wherein the frequency of oscillations in each burst is made to vary from a predetermined low frequency to a predetermined high frequency. The output signal of the amplifier under test is connected, for example, to an oscilloscope either directly or through a detector or rectifier arranged to transmit only the peak voltage or envelope of the amplifier output. At the end of each burst, the amplitude of the wave form of the oscillations reduces to zero and at the same time the beam of the oscilloscope is controlled to retrace its path from the right side of the screen, for example, to the left side of the screen. This retraced path may be, if desired, blanked out so that it is not visible on the screen of the oscilloscope. Theoretically an ideal system would function such that the amplitude of each oscillation in a burst would have the same magnitude as the amplitude of all the other bursts of oscillation. Further, if the frequency response of the amplifier under test was flat over the band of frequencies included in the burst the resultant traces produced on the screen of the oscilloscope would appear to start on the lower left hand corner of the tube face, rise vertically to a certain amplitude, move horizontally to the right, drop vertically to a line corresponding to the starting value and then be traced horizontally to the left back to the starting point, forming thereby a perfect rectangle on the face of the tube. In certain designs it is desirable to blank the retrace path whereby the bottom line of the rectangle would be eliminated.

It is preferable, if not essential, for certain applications, that the amplitude of each oscillation in the burst of high frequency oscillations be held at a non-varying fixed predetermined value. Any variation in the amplitude of an oscillation will produce a corresponding variation in the upper horizontal line of the rectangular oscilloscope pattern. It is known also that it is virtually impossible to distinguish variations due to the irregularity of the amplitude of the burst from the irregularity of the amplitude that is due to an erratic or non-linear parameter of the amplifier such as its transfer characteristic.

In such circuits it is well known that in order to keep the bursts of high frequency electric energy at a constant amplitude use is made of an automatic gain control circuit (AGC) to control or regulate the output of the variable frequency oscillator. As is well known, such AGC action is accomplished by regulating the gain of the oscillator or an amplifier associated therewith in responses to changes in the output thereof. During the period of operation of an oscillator, that is, during the period after the burst of high frequency oscillations has started the AGC can maintain the amplitude of the burst at a substantially constant value. However, at the end of the burst or when the amplitude of the burst of frequencies reduces to zero, the AGC circuit depending upon a signal from the output of the oscillator will automatically attempt to establish or regulate the oscillator for a maximum output even though there is no output signal from the oscillator. This adjustment of the AGC circuit will be set and maintained until the next burst of frequencies is produced by the oscillator. Accordingly, as the burst begins the first cycle or the first part thereof will have a much higher amplitude than it should, or is desired, resulting in a pattern or trace on the cathode ray oscilloscope of a spike, that is, a very sharp large amplitude trace at the left hand edge of the desired pattern. This undesirable spike resulting from the usual operation of an AGC circuit is obviated by the present invention.

SUMMARY

According to the invention, the control voltage produced by an automatic gain control circuit for regulating the gain or amplitude of an intermittent or pulsed oscillator is accomplished by regulating the control voltage to be substantially constant. A pair of diodes are arranged in a loop of a circuit comprising the usual AGC detector but shunting the AGC amplifier. One diode is biased so that when energized by a switching or blanking pulse in phase with the blanking or gating pulse controlling the oscillator, the resulting voltage opposes any change in voltage that is effected across the other diode arranged in circuit to oppose the polarity of the first diode.

BRIEF DESCRIPTION OF THE DRAWING

In the accompanying drawing, comprising but a single figure, there is shown one embodiment of the invention represented in part by a block diagram and in part by a schematic diagram thereof.

DESCRIPTION OF THE PREFERRED EMBODIMENT

Referring now to the drawing, the signal generator 10 is connected in circuit to apply rectangular pulses varying, for example, from zero to −30 volts, to a high frequency oscillator 11. The oscillator is controlled by pulse 30 which turns it on and off periodically. When the oscillator 11 is operating it may have a constant frequency or a variable frequency output. The output of oscillator 11 is applied to an amplifier 12, the wave form of which is shown by 32. The RF amplifier 12 amplifies the signal 32 and produces the output at terminal 13.

The output of the RF amplifier 12 is conducted to an AGC detector circuit 14 by means of conductor 40. The detector comprises a diode 16 and a capacitor 17 shunted to ground. The capacitor 17 is connected in circuit to shunt a detector resistor 18 which is shown connected to ground and in the circuit at connection C. The voltage developed across resistor 18 is applied to an AGC amplifier 19 by conductor 42. The AGC amplifier 19 is a with an adjustable gain control resistor 21 which may be varied to set or to regulate the amplitude of the output oscillation bursts developed at the output terminal 13. The AGC amplifier 19 is connected to the oscillator 11 by means of the conductor 44 and so arranged in the circuit, as well known to control the amplitude of the oscillations produced by the oscillator 11.

The improvement according to the invention includes a pair of diodes 22 and 23 and resistors 24 and 26 arranged in circuit as shown. The diode 23 is connected to the signal generator 10 through a network 20 arranged to invert and to combine the square wave pulse 30 with a direct current bias to produce a pulsed voltage which is modulated on a DC voltage, as illustrated by the wave form 34. A variable resistor 26 is adjusted to match the gain of the secondary AGC loop 52 of the circuit comprising the diode 22 and resistors 24 and 26 to the primary AGC loop 50 comprising the oscillator 11, amplifier 12 and (AGC detector) diode 16.

The diode 23 is arranged in circuit so as to be biased, to be non-conductive during the blanking intervals, i.e. during the off-operation of the oscillator which corresponds, for example, to the portion 38 of the wave form 36 representing the output of the amplifier 12. The diode 22 is connected and is biased thereby to be conductive during the blanking interval.

In operation, as the blanking pulses 30 from signal generator 10 goes from a negative to the positive value the blanking interval ("osc off") of the oscillator occurs and is maintained while the blanking pulse is at its most positive phase. As the blanking pulse falls the oscillator 11 produces the output ('-'osc on"). The diode 23 is non-conductive during the blanking (osc off) interval, while the diode 22 is conductive. This constant voltage, at point C, whose level can be adjusted by resistor 21, regulates the AGC control voltage on conductor 44 to virtually a constant value and thereby allows oscillator 11 to produce only a constant amplitude signal at the end of the blanking pulse without a "spike". When the blanking pulse 30 goes from its most positive value to its most negative value oscillator 11 produces an output frequency (oscillator "on" of wave 32). At this time the modified blanking pulse 34 also caused diode 23 to become conductive which in turn reverse biases diode 22 so that in effect diode 22 becomes an open circuit. This allows normal AGC action for the time that blanking pulse 30 remains at its most negative voltage, i.e. during the oscillator-on operation.

It should be noted that when the oscillator 11 is on, the voltage at point C is determined by and results from the radio frequency amplitude variations at AGC control point D. When the oscillator 11 is off, due to the blanking voltage 30, diode 23 is reversed biased and the voltage at point C is now determined by the voltage at AGC control point B, diode 22 being forward biased by the AGC voltage. The control voltage, it will be noticed, is adjusted by the rheostat 21. It will be seen, therefore, that during the active part of each cycle during which time the oscillations are produced by the oscillator 11, the AGC amplifier 19 controls to substantial constancy the amplitude of the output of the oscillator.

The invention has been illustrated in use with an oscillator gated by a signal generator. It will be appreciated that the invention may be used with modulators, radio-frequency and analogous amplifiers which are subject to automatic gain control (AGC). Accordingly, the invention is applicable to electronic signal devices having a fixed amplitude output at one or a band of frequencies, the amplitude of which being controlled by AGC devices.

Further the invention is not restricted to the embodiment hereinabove illustrated and described. Accordingly, it will be apparent to those skilled in the art that various modifications can be readily made without departing from the scope of the invention which should be limited only in accordance with the appended claims. Thus, where the gain of the AGC amplifier 19 is low compared to the gain of the RF amplifier 12 of any devices in the primary AGC loop 50, it may be necessary to add an active device such as an amplifier in the AGC loop 52 in order to compensate for the relative gains of the two AGC loops.

I claim:

1. An output voltage stabilizing arrangement comprising:

a. means for intermittently generating an electronic signal with a substantially fixed amplitude;

b. an automatic gain control (AGC) device for controlling the output signal amplitude of said signal generating means;

c. a detector responsive to the output of said generating means for producing a voltage for controlling the gain of said AGC device;

d. a source of switching pulses for intermittently gating said signal generating means;

the improvement comprising;

e. a network connected between said signal generating means and the output of said AGC device, f. said network including means responsive to pulses in phase with said switching pulses to intermittently alter the impedance of said network so as to maintain said detector voltage constant, whereby the intermittent output amplitude of said signal generating means is at a substantially constant amplitude.

2. An arrangement according to claim 1 wherein said network comprises:

a. a first diode having its anode connected to the pulse sourse;

b. a resistor in series with said first diode and connected to its cathode;

c. a second diode having its cathode connected at the junction of said resistor and said first diode and its anode connected to the AGC device.

d. means for applying said in-phase pulses to said second diode;

e. said diodes being arranged so that when said signal generating means is rendered operative said first diode is non-conductive and said second diode is conductive, and said second diode is conductive, and when said generator is rendered non-operative said first diode is conductive and said second diode is non-conductive.

3. An arrangement according to claim 2 wherein said series resistor is variable for balancing the gain of said signal generating means and said AGC device.

4. An arrangement according to claim 1 wherein the gain of said AGC device is variable adjustably.

5. An arrangement according to claim 1 wherein said signal generating means is an oscillator.

* * * * *